(12) United States Patent
Oh et al.

(10) Patent No.: US 8,379,367 B2
(45) Date of Patent: Feb. 19, 2013

(54) HYBRID SUPER CAPACITOR USING COMPOSITE ELECTRODE

(75) Inventors: Young Joo Oh, Seoul (KR); Jung Rag Yoon, Yongin-si (KR); Kyung Min Lee, Paju-si (KR); Du Hee Lee, Seoul (KR)

(73) Assignee: Samhwa Capacitor Co., Ltd. (KR)

( * ) Notice: Subject to any disclaimer, the term of this patent is extended or adjusted under 35 U.S.C. 154(b) by 161 days.

(21) Appl. No.: 13/150,605

(22) Filed: Jun. 1, 2011

(65) Prior Publication Data
US 2011/0299223 A1 Dec. 8, 2011

(30) Foreign Application Priority Data
Jun. 4, 2010 (KR) .................. 10-2010-0052680

(51) Int. Cl.
*H01G 9/00* (2006.01)
(52) U.S. Cl. ........ 361/502; 361/503; 361/504; 361/523; 361/525; 361/528; 29/25.01; 29/25.03
(58) Field of Classification Search .................. 361/502, 361/503, 504, 516–519, 523–525, 528–529, 361/303, 305; 29/25.01, 25.03
See application file for complete search history.

(56) References Cited

U.S. PATENT DOCUMENTS

| 5,453,909 A | 9/1995 | Kobayashi | |
|---|---|---|---|
| 6,205,016 B1 * | 3/2001 | Niu | 361/503 |
| 6,414,837 B1 * | 7/2002 | Sato et al. | 361/504 |
| 6,704,192 B2 * | 3/2004 | Pekala | 361/502 |
| 7,548,409 B2 * | 6/2009 | Kojima et al. | 361/503 |
| 8,305,733 B2 * | 11/2012 | Chan et al. | 361/502 |
| 2011/0043968 A1 * | 2/2011 | Kim et al. | 361/528 |

* cited by examiner

*Primary Examiner* — Nguyen T Ha
(74) *Attorney, Agent, or Firm* — Cantor Colburn LLP

(57) ABSTRACT

Provided is a hybrid super capacitor using a composite electrode that may enhance equivalent series resistance (ESR) using a carbon nanotube chain. The hybrid super capacitor includes: an anode 11 including an anode oxide layer 11a and an activated carbon layer applied 11b on the anode oxide layer 11a; and a cathode 21 being disposed to face the anode 11. The cathode 21 may include a silicon oxide layer 21a, a lithium titanium oxide layer 21b disposed on the silicon oxide layer 21a, and a carbon nanotube chain CT formed to pass through the silicon oxide layer 21a and the lithium titanium oxide layer 21b to thereby be electrically connected to each other, thereby enhancing ESR and expanding an output density and a lifespan of the hybrid super capacitor.

16 Claims, 2 Drawing Sheets

| cathode material (Li4Ti5O12) | C-rate | | | | DC-ESR |
|---|---|---|---|---|---|
| | 1A | 3A | 5A | 10A | |
| CT non-contained | 200F | 160F | 120F | 40F | 50 mΩ |
| CT contained | 220F | 200F | 180F | 80F | 40 mΩ |

HYBRID SUPER CAPACITOR USING COMPOSITE ELECTRODE

CROSS-REFERENCE TO RELATED APPLICATION

This application claims the benefit of Korean Patent Application No. 10-2010-0052680, filed on Jun. 4, 2010, in the Korean Intellectual Property Office, the disclosure of which is incorporated herein by reference.

BACKGROUND OF THE INVENTION

1. Field of the Invention

The present invention relates to a hybrid super capacitor using a composite electrode, and more particularly, to a hybrid super capacitor using a complex electrode that may enhance equivalent series resistance using a carbon nanotube chain.

2. Description of the Related Art

An electrochemical double layer capacitor (EDLC) may accumulate electric energy using an aspect that charges are accumulated in an electrochemical double layer formed in an interface between a solid electrode and an electrolyte. The EDLC has a relatively short charging time and has a relatively high output density of 1000 W/kg to 2000 W/kg. In addition, a cycle lifespan characteristic is semi-permanent which is long. The ELDC has a characteristic that a charging and discharging reaction occurs only in the interface, that is, the electrochemical double layer between the electrode and the electrolyte. Since such reaction is limited to the surface, the energy density to be stored may be 1 Wh/kg to 10 Wh/kg which is relatively low.

The EDLC includes an electrode, a separating film, an electrolyte, and a case. A most important element in the EDLC is an electrode material used for the electrode. Since the electrode material needs to have a great electric conductivity and specific surface, and to be electrochemically stable, activated carbon or activated fiber is mostly widely used.

Even though the EDLC may employ a method of increasing a drive voltage in order to increase the energy density, increasing of the drive voltage is limited to the range in which dissolution of electrolyte does not occur and thus, there are some constraints. To solve this, when an activated carbon is used as the electrode material, a charging capacity may increase by increasing pores on the surface of the activated carbon, thereby enhancing the energy density. However, there is some constraint in increasing the pores on the surface of the activated carbon.

A hybrid super capacitor has been developed to enhance the aforementioned energy density of the EDLC. The hybrid super capacitor has enhanced the energy density by employing an activated carbon for an anode and employing a lithium titanium oxide (LTO, $Li_4Ti_5O_{12}$) for a cathode. The lithium titanium oxide has a characteristic that an electric potential is relatively high with respect to lithium and a reactive material with electrolyte or lithium is not extracted in the interface and thus, the stability and a low temperature characteristic is excellent.

A conventional hybrid super capacitor has enhanced the energy density by employing an activated carbon for an anode and employing a lithium titanium oxide for a cathode. However, since the lithium titanium oxide has a relatively high electric potential with respect to lithium, resistance may increase when the lithium titanium oxide is combined with the activated carbon. As described above, when resistance of an electrode material increases, equivalent series resistance (ESR) of the hybrid super capacitor may also increase, thereby deteriorating the output density and lifespan of the hybrid super capacitor.

SUMMARY OF THE INVENTION

An objective of the present invention is to solve the aforementioned problem of the conventional hybrid super capacitor and thus, to provide a hybrid super capacitor using a composite electrode that may enhance ESR using a carbon nanotube chain.

Another objective of the present invention is to provide a hybrid super capacitor using a composite electrode that may enhance electric conductivity by disposing, on a cathode, a silicon oxide layer having a high capacity and an electrically stable lithium titanium oxide layer, and by connecting the silicon oxide layer and the lithium titanium oxide layer using a carbon nanotube chain, and may thereby enhance ESR and also enhance the output density and lifespan.

According to an aspect of the present invention, there is provided a hybrid super capacitor using a composite electrode, including: an anode including an anode oxide layer and an activated carbon layer applied on the anode oxide layer; and a cathode being disposed to face the anode. The cathode may include a silicon oxide layer, a lithium titanium oxide layer disposed on the silicon oxide layer, and a carbon nanotube chain formed to pass through the silicon oxide layer and the lithium titanium oxide layer to thereby be electrically connected to each other.

According to another aspect of the present invention, there is provided a hybrid super capacitor using a composite electrode, including: an anode being applied on each of a front surface and a rear surface of a first aluminum foil, and including an anode oxide layer and an activated carbon layer applied on the anode oxide layer; a cathode being applied on each of a front surface and a rear surface of a second aluminum foil to face the anode to face the anode, and including a silicon oxide layer, a lithium titanium oxide layer disposed on the silicon oxide layer, and a carbon nanotube chain formed to pass through the silicon oxide layer and the lithium titanium oxide layer to thereby be electrically connected to each other; a separating film being disposed between the anode and the cathode to prevent the anode and the cathode from contacting with each other; and a case in which the anode, the cathode, and the separating film are accommodated and an electrolyte containing lithium salt is impregnated. Each of a plurality of carbon nano cathode oxide layers may be connected to a carbon nanotube.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
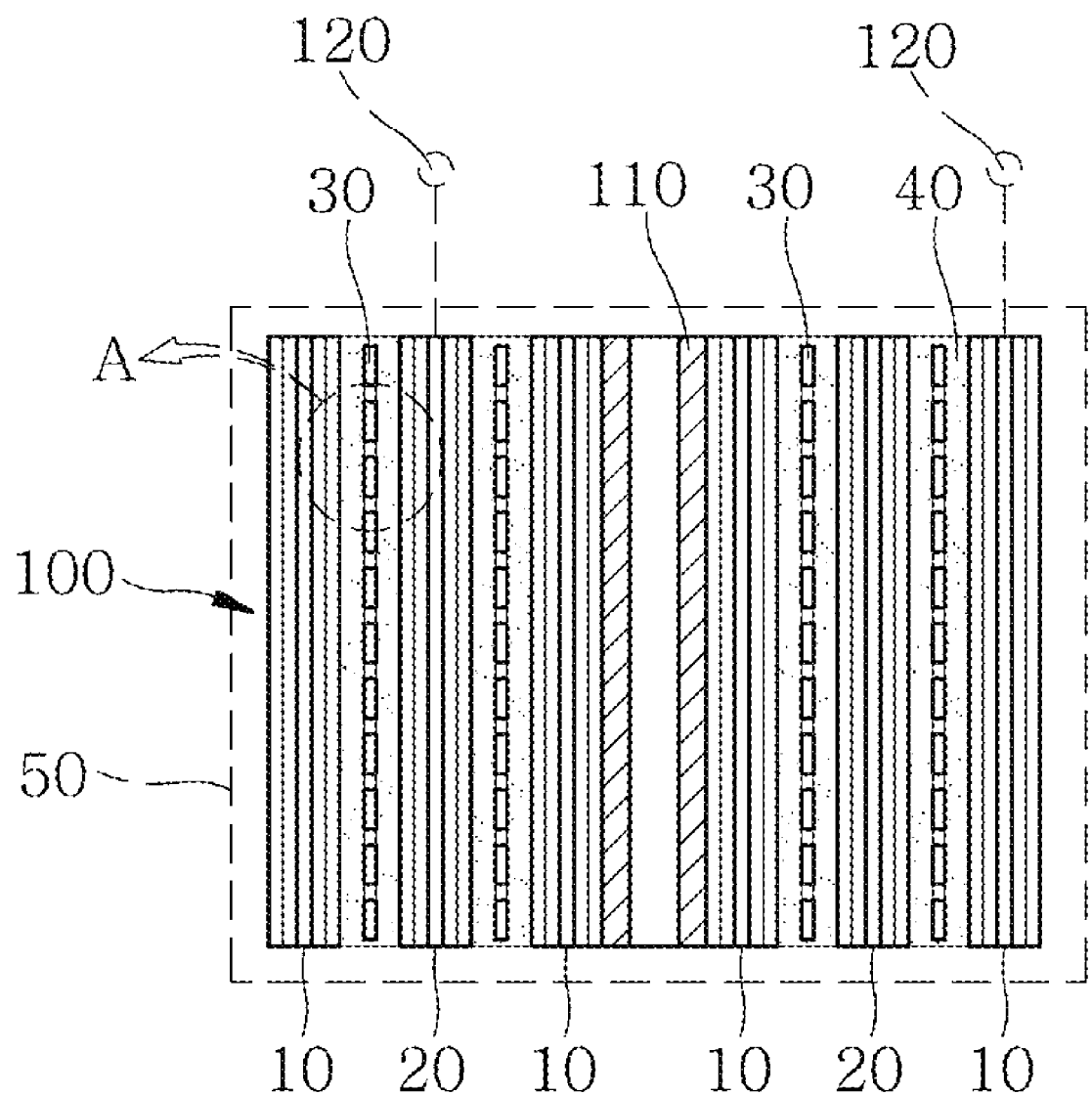
FIG. 1 is a sectional view of a hybrid super capacitor using a composite electrode according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of a hybrid super capacitor using a composite electrode according to the present invention will be described with reference to the accompanying drawings.

Figures 2, 3:
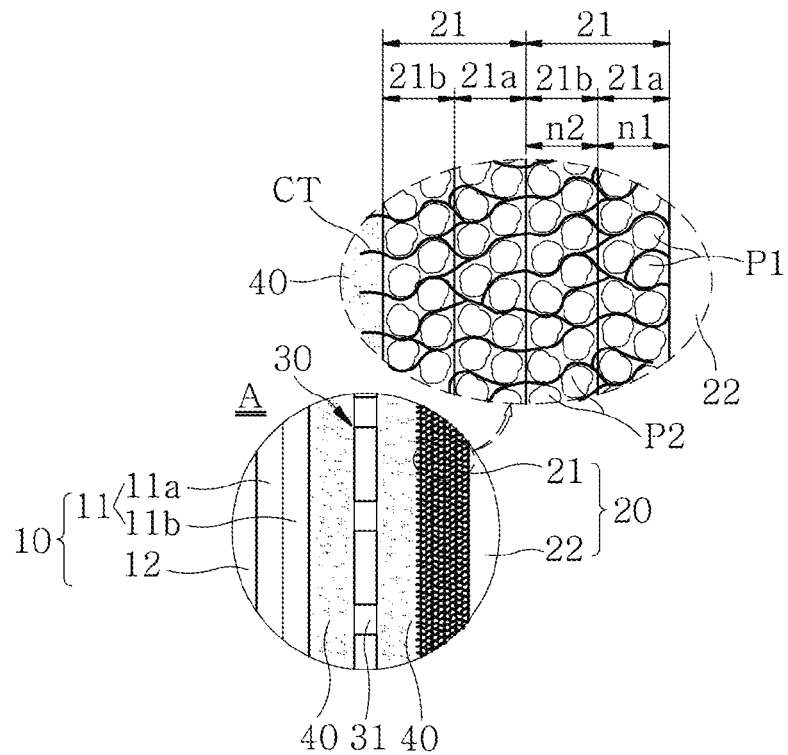
FIG. 2 is an enlarged sectional view of major components of a portion 'A' of FIG. 1.
FIG. 3 is a table showing C-rate characteristic of a hybrid super capacitor using a composite electrode according to an embodiment of the present invention.

As shown in FIG. 1 and FIG. 2, the hybrid super capacitor using the composite electrode of the present invention may include an anode member 10 and a cathode member 20. Hereinafter, a configuration of each of the anode member 10 and the cathode member 20 will be described.

The anode member 10 may include an anode 11 and a first aluminum foil 12. The anode 11 may be applied on each of a front surface and a rear surface of the first aluminum foil 12, and form the composite electrode including an anode oxide layer 11a and an activated carbon layer 11b. That is, the composite electrode including the anode active layer 11a and the activated carbon layer 11b may be used for the anode 11. The anode oxide layer 11a may include an anode active material of 75 wt. % to 90 wt. % and a conductive material of 10 wt. % to 25 wt. %.

A positive electrode, that is, anode active material may select one of a spinel type, an olivine type, and a layered type having a structure in which a battery reaction progresses with lithium ions migrate between the anode 11 and a cathode 21 and thereby lithium may easily migrate. For the spinel type, one of $LiMn_2O_4$ and $Li(MnNi)O_4$ may be selected and be used. $LiFePO_4$ may be used for the olivine type and $LiCoO_2$ may be used for the layered type. Here, the olivine type has a structure in which phosphorous P and oxygen O are tightly combined with each other and thus, may not readily emit oxygen even in a high temperature state, thereby enhancing a stability. Super-p may be used for the conductive material that is mixed with the anode electrode active material to thereby enhance the electric conductivity. For the binder, one of polyvinylienefluoride (PVDF), polyvinyl alcohol (PVA), and polyvinylpyrrolidon (PVP) may be selected and be used.

The activated carbon layer 11b may include activated carbon of 85 wt. % to 95 wt. % and conductive material of 5 wt. % to 15 wt. %. The activated carbon may have a specific surface of 1500 $m^2$/g to 2000 $m^2$/g, and the super-p may be used for the conductive material. To further uniformly mix the activated carbon and the conductive material, the binder may be added. One of PVDF, PVA, and PVP may be selected and be used for the binder.

The cathode member 20 may include the cathode 21 and a second aluminum foil 22. The cathode 21 may be applied on each of a front surface and a rear surface of the second aluminum foil 22. The cathode 21 may be disposed to face the anode 11, and may include a silicon oxide layer 21a, a lithium titanium oxide layer 21b, and a carbon nanotube chain CT. The silicon oxide layer 21a may be applied on each of the front surface and the rear surface of the second aluminum foil 22.

The silicon oxide layer 21a may be formed on the second aluminum foil 22 to have a thickness n1 of 10 nm to 100 nm. Silicon (Si) included in the silicon oxide layer 21a may have a relatively high logic capacity of about 4200 mAh/g. Unlike insertion of a graphite type and tally reaction, the silicon may form an alloy shape in charging lithium ions. In the case of discharging, migration of lithium ions may occur due to a reaction between non-alloy and alloy returning to original unit element material. The silicon Si having a relatively high logic capacity may have a volume expansion of about four folds. Due to iterative charging and discharging cycles, destruction of silicon particles may occur. Due to combination between silicon and lithium, a lithium combination site of silicon may be damaged whereby a cycle characteristic may significantly be deteriorated.

To outperform a disadvantage occurring due to use of the silicon oxide layer 21a containing silicon, the present invention may manufacture the cathode 21 using the composite electrode by forming a lithium titanium oxide layer 21b on the silicon oxide layer 21a and by combining silicon oxide ($SiO_x$) and lithium titanium oxide (LTO). The lithium titanium oxide LTO may have an advantage of a high cycle characteristic, that is, a "zero-strain" characteristic that the volume expansion barely occurs in charging and discharging. By forming the cathode 21 so that the silicon oxide ($SiO_x$) may be combined with the lithium titanium oxide LTO, the volume expansion of the silicon oxide ($SiO_x$) and the low capacity of the lithium titanium oxide LTO may be mutually complemented. Through this, an active material of the cathode 21 having an excellent charging and discharging capacity and an excellent cycle characteristic may be provided.

When the silicon oxide layer 21a includes unit particles of silicon, a destruction resulting from the expansion and contraction that may occur in charging and discharging may relatively less frequently occur compared to silicon oxide ($SiO_x$) including a plurality of particles. However, when a rate of oxygen in the silicon oxide ($SiO_x$) is significantly small, the cycle characteristic may be deteriorated. When the rate of oxygen is significantly high, the discharging capacity may decrease. To enhance this, in the silicon oxide layer 21 of the present invention, x of silicon oxide ($SiO_x$) may have the range of $0<x<2$. The range of x is not limited thereto. Also, in addition to silicon or oxygen, a small amount of impurity having conductivity may be added to the silicon oxide layer 21a.

The lithium titanium oxide layer 21b may be applied on the silicon oxide layer 21a. The lithium titanium oxide layer 21b may be formed to have a thickness n2 of 10 nm to 100 nm. Such lithium titanium oxide layer 21b may include $Li_4Ti_5O_{12}$.

The carbon nanotube chain CT may be formed to pass through the silicon oxide layer 21a and the lithium titanium oxide layer 21b to thereby be electrically connected to each other, whereby the electric conductivity of the cathode 21 may be enhanced. That is, by disposing, on the cathode 21, the silicon oxide layer 21a having a high capacity and the electrically stable lithium titanium oxide layer 21b and by connecting the silicon oxide layer 21a and the lithium titanium oxide layer 21b using the carbon nanotube chain CT having the high electric conductivity, the electric conductivity of the cathode 21 may be enhanced, thereby enhancing ESR and enhancing the output density and lifespan of the hybrid super capacitor using the composite electrode of the present invention.

Together with the anode 11, the cathode 21 may use the composite electrode including the silicon oxide layer 21a, the lithium titanium oxide layer 21b, and the carbon nanotube chain CT. Silicon oxide ($SiO_x$) powder P1 may be used for the silicon oxide layer 21 employed for the cathode 21. Silicon oxide ($SiO_x$) powder P1 may have a property of a high capacity, however, may have a deteriorated reliability. The lithium titanium oxide layer 21b may use lithium titanium oxide ($Li_4Ti_5O_{12}$) powder P2. The lithium titanium oxide ($Li_4Ti_5O_{12}$) powder P2 may have a relatively high electric potential with respect to lithium and lithium and a reactive material with electrolyte may not be extracted in the interface.

Accordingly, while the stability and low temperature characteristic may be enhanced, relatively great resistance may occur.

To enhance disadvantages of silicon oxide ($SiO_x$) powder P1 and lithium titanium oxide ($Li_4Ti_5O_{12}$) powder P2, and to enhance the high capacity and the reliability, the cathode 21 of the present invention may form the composite electrode including the silicon oxide layer 21a and the lithium oxide layer 21b using the silicon oxide ($SiO_x$) powder P1 and the lithium titanium oxide ($Li_4Ti_5O_{12}$) powder P2, respectively. By connecting the silicon oxide layer 21a and the lithium oxide layer 21b using the carbon nanotube chain CT, and enabling the carbon nanotube chain CT to pass through the silicon oxide layer 21a and the lithium oxide layer 21b and thereby be connected to the second aluminum foil 22 and an electrolyte 40, the electric conductivity may be enhanced. Accordingly, the hybrid super capacitor using the composite electrode according to the present invention may have the enhanced output density, and may have an increased lifespan, that is, lifespan cycle.

Each of the anode 11 and the cathode 21 of the hybrid super capacitor using the composite electrode may be formed to have a thickness of 80 μm to 200 μm. The anode 11 may form the anode oxide layer 11a and the activated carbon layer 11b to have a thickness of 80 μm to 200 μm using a known spray method. The cathode 21 may be formed to have a thickness of 80 μm to 200 μm by repeatedly forming the silicon oxide layer 21a and the lithium titanium oxide layer 21b to be in at least one layer.

Hereinafter, a method of enabling the carbon nanotube chain CT to pass through the silicon oxide layer 21a and the lithium titanium oxide layer 21b and thereby be partially exposed will be described.

Using silicon oxide ($SiO_x$) powder P1, the silicon oxide layer 21a may be applied on the second aluminum foil 22 to have the thickness n1 of 10 nm to 100 nm. When the silicon oxide layer 21a is applied, the lithium titanium oxide layer 21b may be formed to have the thickness n2 of 10 nm to 100 nm using lithium titanium oxide ($Li_4Ti_5O_{12}$) powder P2. When applying the lithium titanium oxide ($Li_4Ti_5O_{12}$) powder P2, the lithium titanium oxide ($Li_4Ti_5O_{12}$) powder P2 may be mixed with a dispersed liquid of carbon nanotube and then be applied. Here, the lithium titanium oxide ($Li_4Ti_5O_{12}$) powder P2 and the dispersed liquid of carbon nanotube may be mixed with each other so that a mixture weight ratio may be dispersed liquid of carbon nanotube of 5 wt. % to 20 wt. % to the lithium titanium oxide ($Li_4Ti_5O_{12}$) powder P2 of 80 wt. % to 95 wt. %.

The dispersed liquid of carbon nanotube may be prepared by dispersing carbon nanotube (not shown) using ball milling, an amide type of solvent or dispersant, and the like. When the dispersed liquid of carbon nanotube is prepared, the dispersed liquid of carbon nanotube may be mixed with the lithium titanium oxide ($Li_4Ti_5O_{12}$) powder P2. Next, the mixture may be applied on the surface of the second aluminum foil 22. When the applied is completed, the lithium titanium oxide layer 21b may be formed through dry.

When drying the lithium titanium oxide layer 21b, carbon nanotube may be grown through a thermal process at the temperature of 200 to 400° C. As the carbon nanotube grows through the thermal process, the carbon nanotube may grow to pass through the silicon oxide layer 21a and thereby contact with the second aluminum foil 22, thereby forming the carbon nanotube chain CT. The carbon nanotube chain CT may be formed to grow towards the silicon oxide layer 21a and pass through the lithium titanium oxide layer 21b. The carbon nanotube chain CT may be formed to pass through the silicon oxide layer 21a and the lithium titanium oxide layer 21b, and to be electrically connected to the second aluminum foil 22 and the electrolyte 40, thereby enhancing the electric conductivity of the cathode 21. Accordingly, it is possible to decrease ESR of the hybrid super capacitor using the composite electrode of the present invention.

A hybrid super capacitor using a composite electrode according to another embodiment of the present invention may include the anode member 10, the cathode member 20, the separating film 30, the electrolyte 40, and a case 50 as shown in FIG. 1 and FIG. 2. The anode member 10 and the cathode member 20 may be configured to be the same as the aforementioned embodiment and thus, further detailed description will be omitted here.

The cathode 21 of the cathode member 21 may be formed to have a thickness of 80 μm to 200 μm. The silicon oxide layer 21a and the lithium titanium oxide layer 21b, that is, the cathode 21 may be disposed on each of the front surface and the rear surface of the second aluminum foil 22 to be in at least one layer.

The separating film 30 may be disposed between the anode 11 and the cathode 21 to prevent the anode 11 and the cathode 21 from contacting with each other, thereby preventing a short phenomenon occurring when the anode 11 and the cathode 21 physically contact with each other and thereby electrically are connected to each other. The separating film 30 may have a porosity 31. One of a polypropylene type, a polyethylene type, and a polyolefin type may be selected and be used for the separating film 30 having the porosity 31.

The case 50 may receive an electrode assembly 100 in which the separating film 30 is inserted between the anode member 10 and the cathode member 20 and thereby is wound. When the electrode assembly 100 is received, the case 50 may be impregnated by injecting an electrolyte containing a lithium salt into an inside of the case 50. That is, the electrode assembly 100 may be prepared by inserting the separating film 30 between the anode 11 applied on each of the front surface and the rear surface of the first aluminum foil 12 and the cathode 21 applied on each of the front surface and the rear surface of the second rear foil 22 to face the anode 11. Next, the wound electrode assembly 100 may be inserted and thereby be received in the case 50.

When the electrode assembly 100 is inserted and the electrolyte containing the lithium salt is impregnated, a lead terminal 120 may be connected to each of the anode 11 and the cathode 21. Here, a bobbin 110 may be used when forming the electrode assembly 100 by winding the anode 11 and the cathode 21. When the electrode assembly 100 is wound using the bobbin 110, the electrolyte containing the lithium salt may be impregnated. At least one of $LiClO_4$, $LiN(CF_4SO_2)_2$, $LiBF_4$, $LiCF_3SO_3$, $LiPF_6$, $LiSbF_6$, and $LiAsF_6$ may be selected and be used for the lithium salt.

FIG. 3 illustrates a test result of electrical characteristics of the hybrid super capacitor using the composite electrode of the present invention constructed as above.

A table of FIG. 3 shows a measurement result of a C-rate with respect to the hybrid super capacitor using the composite electrode according to the present invention. Here, the C-rate may be defined as current flowing when a capacity is all discharged within one hour. To measure the C-rate characteristic, the hybrid super capacitor of the present invention prepared the lithium titanium oxide layer 21b of the cathode 21 by mixing, at the weight ratio, dispersed liquid of carbon nanotube 10 wt. % to lithium titanium oxide ($Li_4Ti_5O_{12}$) powder 90 wt. %, and the thermal process of the carbon nanotube chain CT was performed at the temperature of 100° C.

In the case of the hybrid super capacitor of the present invention, since the carbon nanotube chain CT is contained in the cathode 21 of FIG. 2, C-rates became 220 Farad (F), 220 F, 180 F, and 80 F with respect to 1 Ampere (A), 3 A, 5 A, and 10 A, respectively. A direct current (DC) ESR became 40 mΩ. On the other hand, in the case of a conventional hybrid capacitor in which the carbon nanotube chain CT is not contained, C-rates became 200 F, 160 F, 120 F, and 40 F, and DC-ESR became 50 mΩ. As shown in the comparison table of FIG. 3, the hybrid super capacitor using the composite electrode of the present invention has enhanced the C-rate compared to the conventional hybrid capacitor, and has also enhanced the DC-ESR characteristic.

As described above, the hybrid super capacitor, by disposing, on a cathode 21, a silicon oxide layer 21a having a high capacity and an electrically stable lithium titanium oxide layer 21b, and by connecting the silicon oxide layer 21a and the lithium titanium oxide layer 21b using a carbon nanotube chain CT, it is possible to enhance electric conductivity, thereby enhancing ESR and enhancing the output density and lifespan.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A hybrid super capacitor using a composite electrode, comprising:
an anode comprising an anode oxide layer and an activated carbon layer applied on the anode oxide layer; and
a cathode being disposed to face the anode,
wherein the cathode comprises a silicon oxide layer, a lithium titanium oxide layer disposed on the silicon oxide layer, and a carbon nanotube chain formed to pass through the silicon oxide layer and the lithium titanium oxide layer to thereby be electrically connected to each other.

2. The hybrid super capacitor of claim 1, wherein:
the anode oxide layer comprises an anode active material of 75 wt. % to 90 wt. % and conductive material of 10 wt. % to 25 wt. %, and
the anode active material selects one of a spinel type, an olivine type, and a layered type, and the conducive material is super-p.

3. The hybrid super capacitor of claim 2, wherein the spinel type selects one of $LiMn_2O_4$ and $Li(MnNi)O_4$.

4. The hybrid super capacitor of claim 2, wherein the olivine type is $LiFePO_4$.

5. The hybrid super capacitor of claim 2, wherein the layered type is $LiCoO_2$.

6. The hybrid super capacitor of claim 1, wherein:
the activated carbon layer comprises activated carbon of 85 wt. % to 95 wt. % and conductive material of 5 wt. % to 15 wt. %, and
the activated carbon has a specific surface of 1500 $m^2/g$ to 2000 $m^2/g$ and the conductive material is super-p.

7. The hybrid super capacitor of claim 1, wherein:
the silicon oxide layer comprises $SiO_x$, and
x of $SiO_x$ satisfies $0<x<2$.

8. The hybrid super capacitor of claim 1, wherein the silicon oxide layer has a thickness of 10 nm to 100 nm.

9. The hybrid super capacitor of claim 1, wherein the lithium titanium oxide layer comprises $Li_4Ti_5O_{12}$.

10. The hybrid super capacitor of claim 1, wherein the lithium titanium oxide layer has a thickness of 10 nm to 100 nm.

11. A hybrid super capacitor using a composite electrode, comprising:
an anode being applied on each of a front surface and a rear surface of a first aluminum foil, and comprising an anode oxide layer and an activated carbon layer applied on the anode oxide layer;
a cathode being applied on each of a front surface and a rear surface of a second aluminum foil to face the anode to face the anode, and comprising a silicon oxide layer, a lithium titanium oxide layer disposed on the silicon oxide layer, and a carbon nanotube chain formed to pass through the silicon oxide layer and the lithium titanium oxide layer to thereby be electrically connected to each other;
a separating film being disposed between the anode and the cathode to prevent the anode and the cathode from contacting with each other; and
a case in which the anode, the cathode, and the separating film are accommodated and an electrolyte containing lithium salt is impregnated,
wherein each of a plurality of carbon nano cathode oxide layers is connected to a carbon nanotube.

12. The hybrid super capacitor of claim 11, wherein the anode has a thickness of 80 μm to 200 μm.

13. The hybrid super capacitor of claim 11, wherein the cathode has a thickness of 80 μm to 200 μm.

14. The hybrid super capacitor of claim 11, wherein the cathode is disposed on each of the front surface and the rear surface of the second aluminum foil in at least one layer.

15. The hybrid super capacitor of claim 11, wherein the separating film has a porosity, and the separating film having the porosity selects one of a group comprising a polypropylene type, a polyethylene type, and a polyolefin type.

16. The hybrid super capacitor of claim 11, wherein the lithium salt selects at least one of a group comprising $LiClO_4$, $LiN(CF_4SO_2)_2$, $LiBF_4$, $LiCF_3SO_3$, $LiPF_6$, $LiSbF_6$, and $LiAsF_6$.

* * * * *